C. E. DAVIDSON.
AUTOMOBILE JACK.
APPLICATION FILED APR. 7, 1915.

1,168,935.

Patented Jan. 18, 1916.
2 SHEETS—SHEET 1.

WITNESSES:

INVENTOR
CHARLES E. DAVIDSON,
BY Munn & Co.
ATTORNEYS

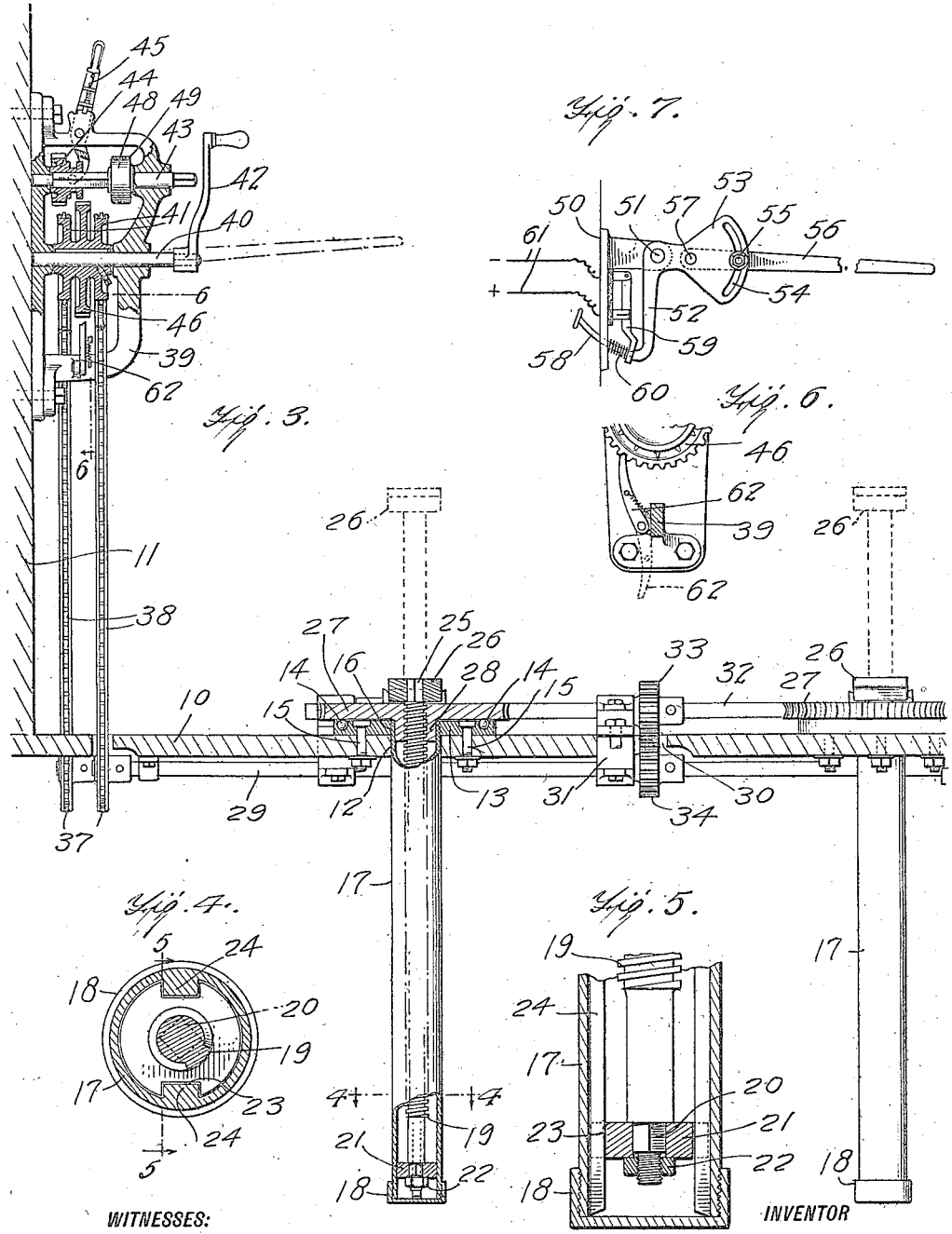

UNITED STATES PATENT OFFICE.

CHARLES EDWARD DAVIDSON, OF OZONA, TEXAS.

AUTOMOBILE-JACK.

1,168,935.  Specification of Letters Patent.  Patented Jan. 18, 1916.

Application filed April 7, 1915. Serial No. 19,717.

*To all whom it may concern:*

Be it known that I, CHARLES E. DAVIDSON, a citizen of the United States, and a resident of Ozona, in the county of Crockett and State of Texas, have invented an Improvement in Automobile-Jacks, of which the following is a specification.

The present invention relates to a hoisting apparatus, and more particularly to an automobile jack adapted for use in lifting the vehicle after the same is stored in a garage, whereby constant pressure on the tires will be avoided and the making of necessary repairs facilitated.

Briefly stated, the invention comprises a plurality of casings mounted in and extending below the flooring of a garage, each of said casings having a lifting member in the form of a screw spindle vertically movable therein.

Primary driven shafts are mounted below the flooring and operate secondary driven shafts which in turn transmit power to suitable means engaging the lifting members, whereby the same may be elevated. The primary driven shafts are suitably connected to an operating mechanism comprising a drive shaft geared up to said primary driven shafts, said drive shaft being preferably operated by a small motor. The invention also contemplates providing suitable means operated by the upward movement of the vehicle on the lifting members to stop the motor at a predetermined point.

The inventive idea involved is capable of receiving a variety of mechanical expressions, one of which for the purpose of illustrating the invention, is shown in the accompanying drawings; but it is to be expressly understood that said drawings are used merely to facilitate the description of the invention as a whole, and not to define the limits thereof, reference being had to the appended claims for this purpose.

Figure 1:
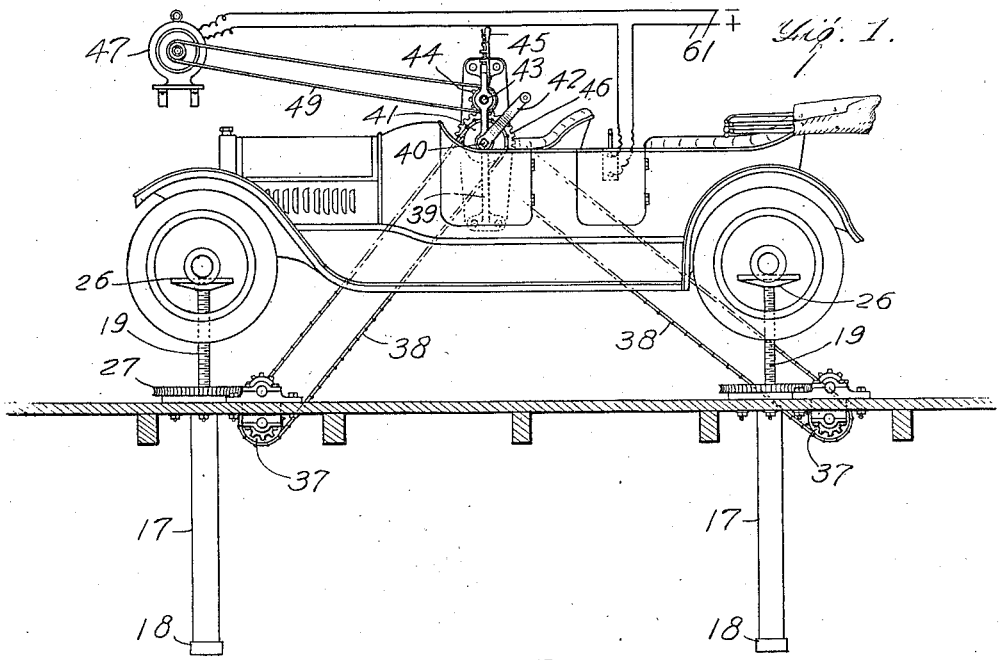
Figure 2:
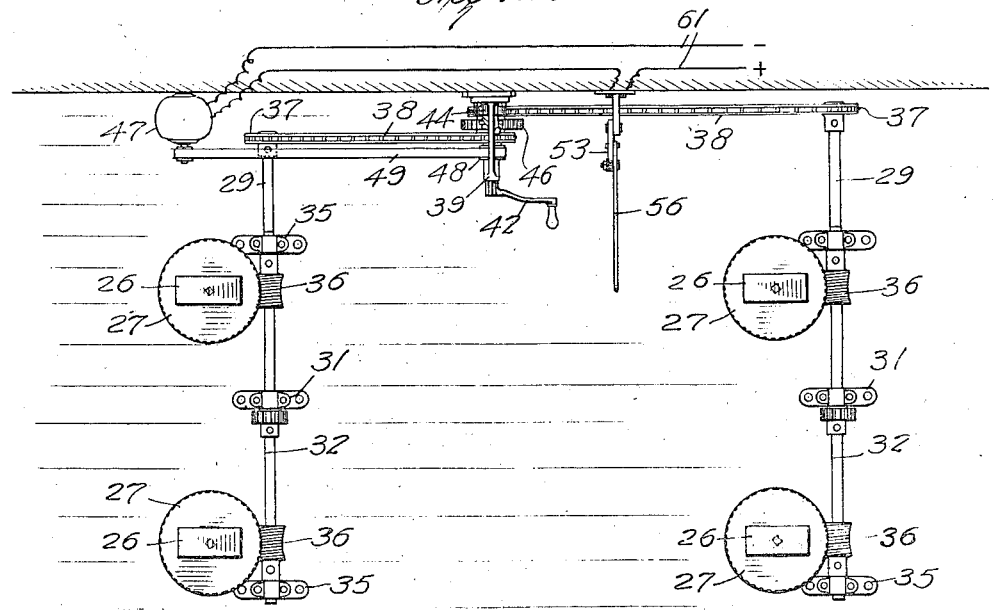

In the drawings:—Figure 1 is a side elevation of the invention, illustrating its application. Fig. 2 is a top plan view thereof with the flooring removed. Fig. 3 is an end elevation of the invention, parts being broken away and shown in section. Fig. 4 is an enlarged cross section on the line 4—4 of Fig. 3. Fig. 5 is a vertical section on the line 5—5 of Fig. 4. Fig. 6 is a fragmentary detail on the line 6—6 of Fig. 3 of the means for retaining the lifting members in elevated position, and Fig. 7 is a detail side elevation of the means contacted by the vehicle in its upward movement to stop the motor.

Referring more particularly to the accompanying drawings in which like reference characters designate similar parts, the numeral 10 indicates the flooring of a garage and 11 one wall thereof. The flooring 10 is provided with a plurality of openings 12 therein, the number of said openings being optional, there being four shown in the present construction. A bearing plate 13 having a ball bearing race 14 in its upper surface is bolted to the flooring as indicated at 15 adjacent each of the openings 12 and is provided with a centrally located screw threaded opening 16 for the reception of the upper end of an elongated cylindrical casing 17, which extends through the opening 12 in the flooring 10. The lower end of the casing 17 is provided with a removable cap 18 whereby the parts in said casing are rendered accessible should it be desired to remove or repair the same. This casing 17 is adapted to contain a suitable lubricant whereby the vertically arranged screw spindle 19 in said casing may be lubricated. The spindle 19 is screw threaded for the major portion of its length as shown and is provided at its lower end with a square head 20 upon which is mounted a guide plate 21 secured in position by the nut 22 and having the oppositely disposed guide grooves 23 therein adapted to engage the vertically arranged guide strips 24 secured to the inner wall of the casing. This construction prevents any rotation of the spindle 19 during its movement back and forth in the casing 17. The spindle is also provided at its upper end with a square head 25 adapted to receive an axle engaging block 26. Mounted between the block 26 and the bearing plate 13 is the worm wheel 27 having a hub 28 projecting into the casing 17 and provided with an internally threaded opening for the reception of the spindle 19, said wheel having a bearing on the race 14 and being steadied in its movement by the engagement of the hub 28 with the end of the casing 17.

Mounted under the flooring 10, so as not to be interfered with when the vehicle is driven into the garage, are the primary driven shafts 29, one of which is adapted to operate the spindles for the front axle of the vehicle while the other driven shaft operates the spindles for the rear axle, said shafts extending transversely of the machine. In an opening 30 formed in the flooring 10 intermediate the front and rear axle engaging spindles, is mounted a bearing 31 which supports, above the flooring 10, the secondary driven shafts 32, the same being provided with a gear wheel 33, which meshes with a gear wheel 34 carried by the primary shaft 29 whereby said secondary shaft is rotated. The shaft 32 is also provided adjacent its ends with bearings 35 and contiguous to said bearings the shaft is provided with the worms 36 adapted for engagement with the worm wheel 27 whereby the latter is rotated to elevate and lower the spindles 19.

Each of the primary driven shafts 29 is provided on the end thereof adjacent the walls 11 with a sprocket wheel 37, each wheel being adapted to receive a drive chain 38. A bracket 39 of any suitable construction is secured to the wall 11, and has journaled therein a shaft 40 having thereon a pair of spaced sprocket wheels 41 each of which is adapted to receive one of the chains 38. The sprocket wheels 41 are made of a larger diameter than the wheels 37, whereby the spindles 19 may be quickly raised into engagement with the axles of the vehicle, said shaft being operated by a suitable handle 42.

Journaled in the bracket 39 above the shaft 40 is another drive shaft 43 having a small gearing 44 shiftable thereon by means of a lever 45, said gearing 44 being adapted to be moved into and out of engagement with a large gear wheel 46 mounted upon the shaft 40 intermediate the sprocket wheels 41. When the gear wheel 44 is in engagement with the gear wheel 46, the shaft 43 may be rotated by removing the handle 42 from the shaft 40 and placing it on said shaft 43 and said gear wheels are of such proportion as to permit of sufficient power being applied to the spindles 19 to lift the vehicle. Preferably, however, the shaft 43 is operated by a suitable motor 47 connected to a drum 48 on said shaft by means of a belt 49. The mechanism just described is located on the wall of the garage and in reach of the driver's seat of the vehicle whereby the same may be readily operated without the necessity of the driver first getting out of the machine.

An automatic means is provided for stopping the motor 47 after the vehicle has been elevated from the floor a predetermined distance, said means comprising a bracket 50 secured to the wall 11 and having pivoted thereto at 51, a bell crank lever 52. One end 53 of the bell crank lever is in the form of a segment provided with a slot 54 adapted to receive a pin 55 carried by a contact lever 56 pivoted to the bell crank lever 52 at 57. The lever 56 may be adjusted at any desired angle to the bell crank lever and may be secured in its adjusted position by means of a thumb screw engaging the pin 55. The lever 56 extends outwardly into the path of the upward movement of the vehicle and upon contact therewith said lever is raised and rocks the bell crank lever 52 about its pivot 51. The other end of the bell crank lever 52 is provided with an extension 58 in engagement with the free end of a switch lever 59, said extension having coiled thereabout a spring 60 which causes the disengagement of the lever 59 with the switch terminals, thereby breaking the circuit 61 of the motor 47, thus stopping any further upward movement of the spindles 19. In order to retain the spindles in elevated position, a locking dog 62 is pivoted to the bracket 39 at the lower end thereof, the free end of said dog being adapted to engage the teeth of the gear wheel 46 and prevent rotation thereof in one direction. When it is desired to again lower the vehicle, the dog 62 is released from engagement with the gear wheel 46, thus releasing the parts and permitting the spindles to return to their lower position by reason of the weight of the vehicle.

I claim:—

1. In an automobile jack, the combination of a plurality of vertically movable lifting members, a lubricant containing casing surrounding each of said members, guide strips extending longitudinally thereof, a guide plate carried by each lifting member and engaging said strips to prevent turning of said member, a worm wheel engaging said member and operable to lift the same, a secondary driven shaft engaging the worm wheel, a primary driven shaft operating said secondary shaft, and means for operating said primary shaft.

2. In an automobile jack, the combination of a plurality of vertically movable lifting members mounted in and extending beneath the flooring, a lubricant containing casing surrounding each of said members, guide strips extending longitudinally thereof, a guide plate carried by each lifting member and having grooves therein for receiving said strips to prevent turning of said member, a worm wheel engaging said member and operable to lift the same, a bearing for said worm wheel secured to said flooring, a secondary driven shaft engaging said worm wheel, a primary driven shaft operating said secondary shaft and means for operating said primary shaft.

3. In an automobile jack, the combination with a pair of lifting members and a cog wheel for each of said members; of secondary driven shafts operating said cog wheel, primary driven shafts connected to said secondary driven shafts, a chain drive for said primary driven shafts, a shaft for operating said chain drive, means including a source of current for operating the last named shaft, and means operated by the upward movement of the vehicle on said lifting members for stopping said last-named shaft.

4. In an automobile jack, the combination with a pair of lifting members and a cog wheel for each of said members; of secondary driven shafts operating said cog wheel, primary driven shafts connected to said secondary driven shafts, a chain drive for said primary driven shafts, a shaft for operating said chain drive, means including a source of current for operating the last-named shaft, and automatically operated means for stopping said last-named shaft.

5. In an automobile jack, the combination with a pair of lifting members and a cog wheel for each of said members; of secondary driven shafts operating said cog wheel, primary driven shafts connected to said secondary driven shafts, a chain drive for said primary driven shafts, a shaft for operating said chain drive, means including a source of current for operating the last-named shaft, and adjustable automatically operated means for stopping said last-named shaft.

6. In an automobile jack, the combination of a flooring, a plurality of lifting members mounted therein and extending beneath the same, a cog wheel for each of said members, secondary driven shafts mounted above said flooring and extending transversely of the vehicle for operating said cog wheels, primary driven shafts below said flooring and arranged in superposed relation to said secondary shafts and connected thereto, and means connected to said primary driven shafts for operating said cog wheels to raise said lifting members.

7. In an automobile jack, the combination of a plurality of lifting members, a drive shaft for operating said members, an electric switch controlling the operation of said drive shaft, a bell crank lever having one arm connected to said switch, an adjustable arm pivoted to the other arm of said lever and actuated by the upward movement of a vehicle on said lifting members, whereby to open said switch to stop said drive shaft.

8. In an automobile jack, the combination of a plurality of vertically movable lifting members, means including a drive shaft for raising the said members, releasable means for retaining said lifting members in elevated position, the latter being adapted to be returned to lowered position by the weight of the vehicle thereon when the last-named means is released, and means operated by the upward movement of the vehicle on said lifting members for stopping said shaft.

9. In an automobile jack, the combination of a plurality of lifting members, a gear associated with each member, secondary driven shafts operating said gears, primary driven shafts operating said secondary shafts, means for driving said primary shafts, means for operating said driving means, a source of power for operating the last-named means, and an adjustable device operated by the upward movement of the vehicle on said lifting means for stopping the operation of said source of power.

CHARLES EDWARD DAVIDSON.

Witnesses:
MARK LAURANCE BURCHETT,
HOLLIS WEAVER.